United States Patent
Colbert

Patent Number: 5,485,510
Date of Patent: Jan. 16, 1996

[54] SECURE CREDIT/DEBIT CARD AUTHORIZATION

[75] Inventor: Raymond O. Colbert, Naperville, Ill.

[73] Assignee: AT&T Corp., Murray Hill, N.J.

[21] Appl. No.: 300,096

[22] Filed: Sep. 1, 1994

Related U.S. Application Data

[63] Continuation of Ser. No. 953,418, Sep. 29, 1992.

[51] Int. Cl.⁶ .......................... H04M 17/00; H04M 11/00
[52] U.S. Cl. ...................... 379/145; 379/91; 340/825.33; 235/380
[58] Field of Search ................ 379/91, 145; 340/825.33, 340/825.34, 825.35

[56] References Cited

U.S. PATENT DOCUMENTS

| | | | |
|---|---|---|---|
| 4,439,636 | 3/1984 | Newkirk et al. | 179/7.1 R |
| 4,707,592 | 11/1987 | Ware | 379/91 |
| 4,731,818 | 3/1988 | Clark, Jr. et al. | 379/144 |
| 4,750,201 | 6/1988 | Hodgson et al. | 379/144 |
| 4,797,540 | 1/1989 | Kimizu | 235/383 |
| 4,893,330 | 1/1990 | Franco | 379/91 |
| 4,935,956 | 6/1990 | Hellwarth et al. | 379/112 |
| 4,947,028 | 8/1990 | Gorog | 235/380 |
| 4,972,461 | 11/1990 | Brown et al. | 379/67 |
| 5,023,904 | 1/1991 | Kaplan et al. | 379/91 |
| 5,053,606 | 10/1991 | Kimizu | 235/380 |
| 5,163,086 | 11/1992 | Ahearn et al. | 379/91 |
| 5,181,238 | 1/1993 | Medamana et al. | 379/95 |
| 5,274,695 | 12/1993 | Green | 379/91 |

*Primary Examiner*—Stephen Chin
*Assistant Examiner*—Kevin Kim
*Attorney, Agent, or Firm*—Werner Ulrich; Mony R. Ghose

[57] ABSTRACT

This invention relates to methods for making a credit/debit card purchase without revealing the card number to the vendor of services or goods. The card holder is connected to a data base and provides the card number, plus holder identity verification, to the data base. The data base then verifies whether the card holder is authorized to incur the expense of the purchase, and, if so, provides an authorization indication or code to the vendor; the card number cannot be derived from the authorization information, thus helping to preserve the secrecy of the card number.

26 Claims, 2 Drawing Sheets

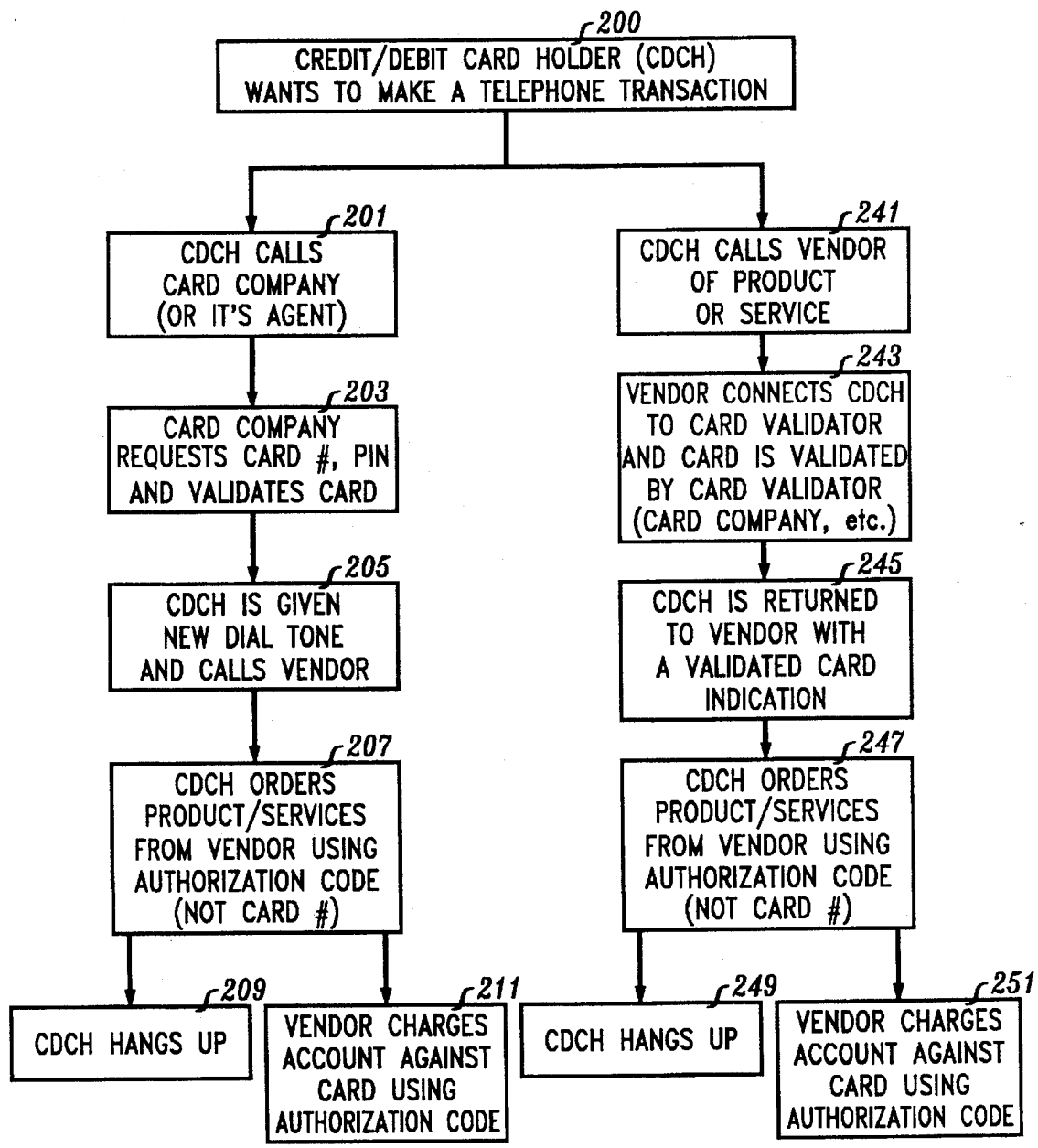

SECURE CREDIT/DEBIT CARD AUTHORIZATION

This application is a continuation of application Ser. No. 07/953418, filed on Sep. 29, 1992.

TECHNICAL FIELD

This invention relates to a method for authorizing a credit/debit card holder to purchase goods or services.

PROBLEM

In recent years, telephone ordering of merchandise has become an increasingly common method of purchase. In a typical transaction, a caller calls a store, indicates the merchandise that is to be bought, provides his/her address for the delivery of the merchandise, and provides a credit/debit card (CDC) number. The vendor verifies that the CDC is valid and charges the purchase to that CDC. The vendor then sends the merchandise to the customer. A problem of this method of operation is that the customer must provide his/her CDC number to the vendor. This tends to compromise the secrecy of the CDC number which makes possible the fraudulent use of such a number. The possibility of such fraudulent use helps to keep the rates charged by credit card companies to the vendors high, and limits teletransaction usage.

SOLUTION

In accordance with applicant's invention, an advance is made over the methods of the prior art by connecting a customer desiring to order merchandise to the data base of a CDC company or to its authorized agent such as a common carrier; the caller then provides the CDC number to the data base, which after checking the authorization of the CDC number, provides an authorization indication to a vendor. The vendor charges the credit card company for the purchase using the authorization code. Advantageously, the credit card number is only provided to the credit card company or carrier, not to the vendor.

In accordance with one feature of the invention, identification methods are used to identify the caller and only provide authorization for the purchase (transaction) if the caller is the owner of the CDC. In one specific embodiment of the invention, the caller is identified using voice recognition. Alternatively, or in addition, a personal identification number is used. Alternatively, or in addition, the caller is identified using automatic number identification (ANI) which is forwarded to the card company or agent as part of the caller identification.

In accordance with one feature of the invention, the authorization indication comprises an authorization code for tracking a purchase transaction. The authorization code contains one a- more fields. One such field is used to identify the vendor and thereby simplify the process of billing for the credit company. Another field provides the name and/or address of the credit card holder to reduce the effort of the vendor for obtaining this data. Another field specifies the dollar limit of the amount of credit being authorized for this transaction. Another field specifies a limit of the time for which such credit is being allowed. Another field specifies the date and time of the authorization.

BRIEF DESCRIPTION OF THE DRAWING

FIG. 2 is a flow diagram of the steps of a method for implementing the invention.

DETAILED DESCRIPTION

Figure 1:
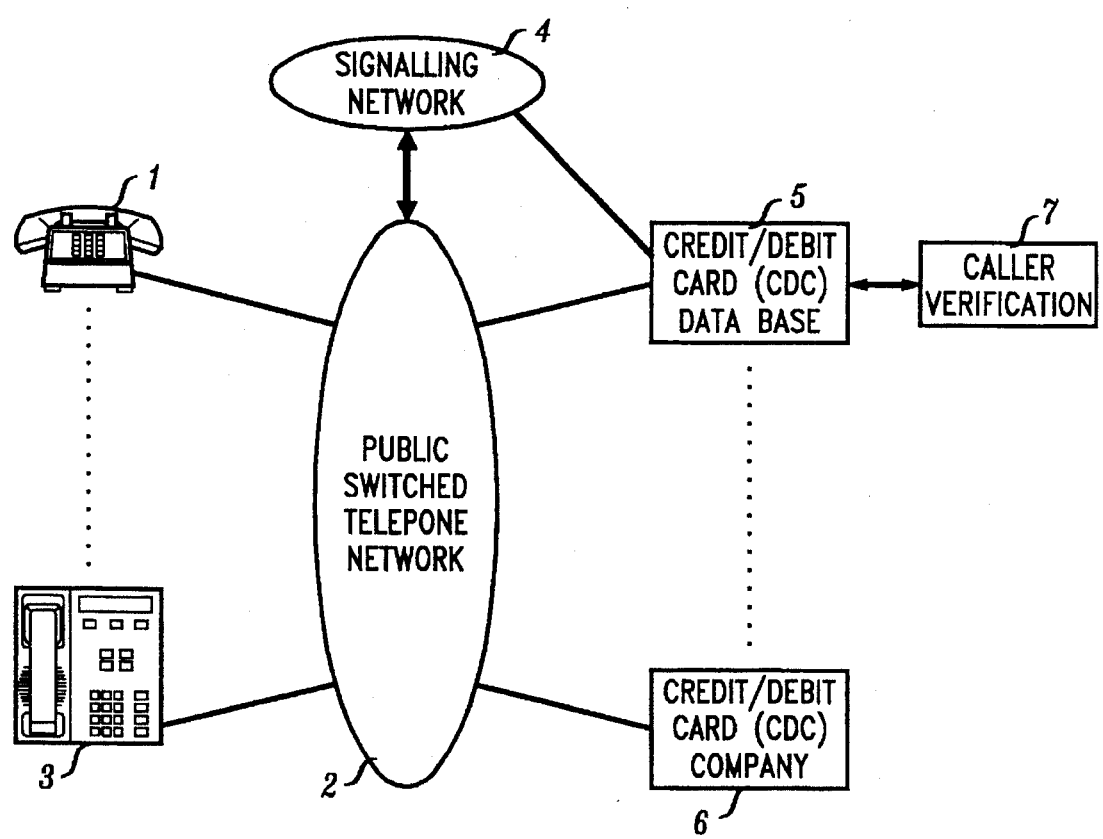
FIG. 1 is a block diagram illustrating the operation of applicant's invention.

FIG. 1 is a block diagram of the operation of applicant's invention. A purchaser at a calling station 1 is connected via a telecommunications network 2, such as the public switched telephone network, to a credit/debit card (CDC) data base 5. The calling station provides to the data base 5 a CDC number, a personal identification number (PIN), and a sample of the caller's voice. The sample is routed to caller verification system 7 which is used to recognize the voice and to ensure that the recognized voice corresponds to the specified credit/debit card. The caller is then provided with new dial tone and calls the vendor 3. The telephone number of the vendor is passed from network 2 to CDC data base 5 using signaling network 4. The identity of the vendor is the final piece of data required by the CDC data base to provide the authorization code. This authorization code is passed from CDC data base 5 via signaling network 4 and network 2 to vendor 3. In one specific implementation of applicant's invention, the authorization number is provided over a D-channel of an integrated services digital network (ISDN) link to the vendor. Alternatively, this information may be provided using other signaling techniques such as dual tone multifrequency (DTMF) signaling.

After the vendor has received the authorization code, the vendor is connected to the calling station, and receives verbal instructions from the calling station. These verbal instructions, such as for merchandise to be ordered, are associated with the received authorization number and the vendor then transmits via network 2 and signaling network 4, the authorization code plus merchandise and charge information to the CDC data base 5 to charge the customer appropriately. The charge is valid only if the au horization code and the vendor identification correspond and any restrictions such as dollar limit and time limit are satisfied. The CDC company 6 is connected via the network and optionally via a data link to the CDC data base to allow the data base to be updated, for example, when a credit card is found to have been lost.

The authorization may be simply a positive indication to the vendor, but in the preferred embodiment, the authorization includes an authorization code.

In accordance with one feature of the invention, the authorization indication comprises an authorization code for tracking a purchase transaction. The authorization code contains one or more fields. One such field is used to identify the vendor and thereby simplify the process of billing for the credit company. Another field provides the name and/or address of the credit card holder to reduce the effort of the vendor for obtaining this data. Another field specifies the dollar limit of the amount of credit being authorized for this transaction. Another field specifies a limit of the time for which such credit is being allowed. Another field specifies the date and time of the authorization.

FIG. 2 is a flow diagram of steps performed to practice applicant's invention. Initially, block 200, a CDC holder (CDCH) wants to make a teletransaction. Block 201 and its succeeding blocks illustrate a method wherein the CDCH initially calls the data base of a card company or its agent.

Block 203 illustrates that the card company requests the card number, and a PIN or a voice sample, and validates the card and its user; this request may not be necessary if the caller's telephone station has been identified by an Automatic Number Identification (ANI) number forwarded to the data base, and matching the recorded telephone number for that CDC. The data base verifies the authorization of the CDC holder to incur the expense and prepares an authorization code for transmission to the vendor. If the CDCH is so authorized, the CDCH is then given a new dial tone and calls the vendor (block 205). Block 207 indicates that the CDCH orders the products/services from the vendor who has been automatically provided with the authorization code. Eventually, the CDCH disconnects (block 209) and the vendor charges against the card using the authorization code (block 211 ) if the transaction has been authorized and the time and dollar values are not exceeded. This can be performed either by the vendor filling out a credit ticket or by the vendor providing information which is immediately sent back as a data message to the CDC data base.

An alternate approach is illustrated in block 241 and its successors. Here the CDCH calls the vendor directly (action block 241). The vendor connects the CDCH to the card validator data base and the card validation is performed in a transaction between the calling station 1 and CDC data base 5. The transfer of calling station 1 to CDC data base 5 is performed by setting up a connection between the CDCH and the data base in such a way that it is impossible for the vendor to eavesdrop on this connection. The card is validated by the card validator using the card number, the PIN, and/or, if appropriate, voice recognition (action block 243). The CDCH is then returned to the vendor who is provided with an authorization code from the data base (action block 245). The CDCH then orders the products and the service against the authorization code received by the vendor (action block 247) and the CDCH eventually hangs up (action block 249). The vendor charges against the CDC using the authorization code (action block 251).

Note that in both of these scenarios the credit/debit card number is not provided to the vendor who, only receives the authorization code.

In another alternative arrangement, when a customer has selected his/her merchandise or service, the customer is connected to the CDC data base from a convenient station, possibly including a card reader, located in the vendor's store. After the CDC number has been entered and the transaction authorized, the authorization code is provided audibly or in video or printed form for the vendor, at the convenient station or at an associated terminal.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. In a database system for authorizing a credit/debit card (CDC) expenditure, a method for authorizing credit/debit for a purchase of goods or services comprises:

receiving data in the database over a first telecommunications connection to the database from a CDC holder at a first location, the data identifying a specific CDC;

determining whether the CDC is authorized to incur an expenditure;

transmitting an authorization to incur the expenditure over a second telecommunications connection from the database to a vendor at a second location, wherein transmitting the authorization is responsive to a determination that the CDC is authorized to incur the expenditure and includes a limit of allowed expenditure generated by the database for a transaction; and wherein the data identifying the CDC is not provided to the vendor.

2. The method of claim 1 wherein the authorization comprises an authorization code for tracking a purchase transaction.

3. The method of claims 1 or 2 wherein the data received in the database further comprises data for verifying the identity of the holder of the CDC.

4. The method of claim 3 wherein the data from verifying the identity of the holder of the CDC comprises a personal identification number.

5. The method of claim 5 wherein the data for verifying the identity of the holder of the CDC comprises an automatic number identification of a caller station supplying the CDC identification.

6. The method of claims 1 or 2 further comprising:

establishing a voice connection to a voice recognition means for recognizing the identity of a caller; and using output of the voice recognition means to identify the holder of the CDC.

7. The method of claim 2 wherein the authorization code comprises an identification of a vendor.

8. The method of claim 2 wherein the authorization code includes date and/or time data.

9. The method of claim 2 wherein the authorization code includes a time limitation for a transaction.

10. The method of claim 2 wherein the authorization code comprises the name of the CDC holder.

11. The method of claim 2 wherein the authorization code comprises an address of the CDC holder.

12. The method of claim 1 or 2 wherein the identification of the CDC is not derivable from the authorization.

13. In a database system for authorizing a credit/debit card (CDC) expenditure, a method for authorizing credit/debit for a purchase of goods or services comprises:

receiving data in the database over a first telecommunications connection from a CDC holder at a first location, the data identifying a specific CDC;

determining whether the CDC is authorized to incur an expenditure;

transmitting an authorization from the database to incur the expenditure over a second telecommunications connection to a vendor at a second location, wherein transmitting the authorization is responsive to a determination that the CDC is authorized to incur the expenditure;

establishing a third telecommunications connection between the vendor and the holder identified by the CDC for specifying goods and services to be purchased; and wherein the data identifying the CDC is not provided to the vendor.

14. The method of claim 13 wherein the authorization comprises an authorization code for tracking a purchase transaction.

15. The method of claims 13 or 14 wherein the data received in the database further comprises data for verifying the identity of the holder of the CDC.

16. The method of claim 15 wherein the data from verifying the identity of the holder of the CDC comprises a personal identification number.

17. The method of claim 15 wherein the data for verifying the identity of the holder of the CDC comprises an automatic number identification of a caller station supplying the CDC identification.

18. The method of claims 13 or 14 further comprising:
   establishing a voice connection to a voice recognition means for recognizing the identity of a caller; and
   using output of the voice recognition means to identify the holder of the CDC.

19. The method of claim 14 wherein the authorization code comprises a limit of allowed expenditure for a transaction.

20. The method of claim 14 wherein the authorization code comprises an identification of a vendor.

21. The method of claim 14 wherein the authorization code includes date and/or time data.

22. The method of claim 14 wherein the authorization code includes a time limitation for a transaction.

23. The method of claim 14 wherein the authorization code comprises the name of the CDC holder.

24. The method of claim 14 wherein the authorization code comprises an address of the CDC holder.

25. The method of claim 13 or 14 wherein the identification of the CDC is not derivable from the authorization.

26. The method of claim 2 or 14 wherein the CDC holder receives data comprising a portion of the authorization code, whereby the CDC holder can furnish an identification to the vendor without revealing the CDC number.

* * * * *